Aug. 1, 1944. F. WEYERHAEUSER 2,354,725
MANUFACTURE OF COMPOSITE LUMBER, AND ARTICLE THEREFOR
Filed March 24, 1939 3 Sheets-Sheet 1

Inventor
Frederick Weyerhaeuser
by W. Bartlett Jones
Attorney.

Aug. 1, 1944. F. WEYERHAEUSER 2,354,725
MANUFACTURE OF COMPOSITE LUMBER, AND ARTICLE THEREFOR
Filed March 24, 1939 3 Sheets-Sheet 2
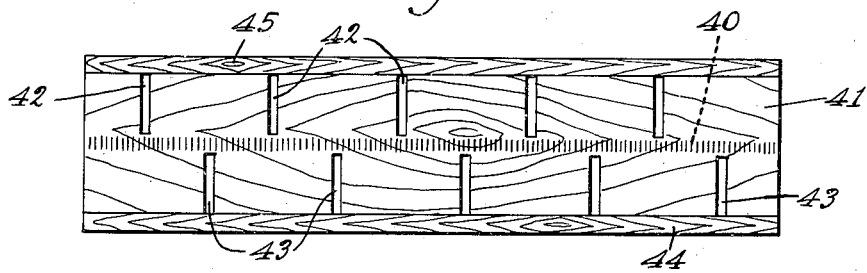
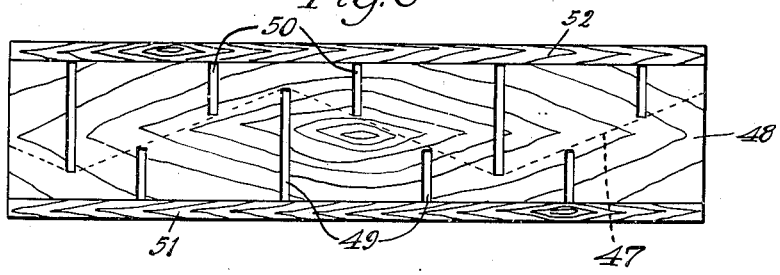
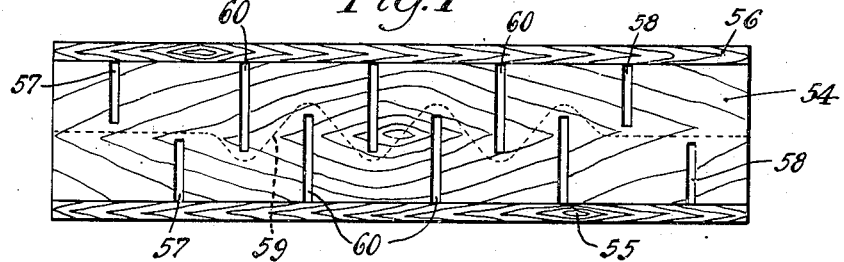
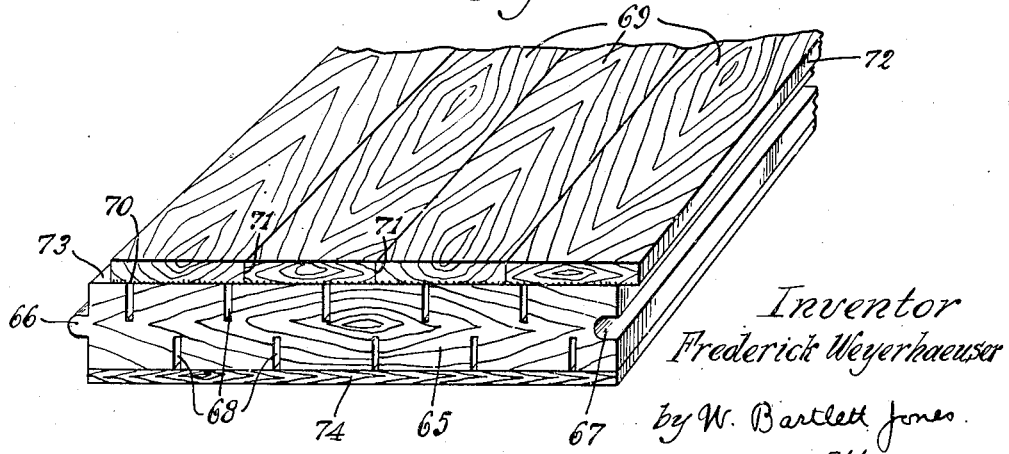
Inventor
Frederick Weyerhaeuser
by W. Bartlett Jones.
Attorney.

Aug. 1, 1944.   F. WEYERHAEUSER   2,354,725
MANUFACTURE OF COMPOSITE LUMBER, AND ARTICLE THEREFOR
Filed March 24, 1939   3 Sheets-Sheet 3
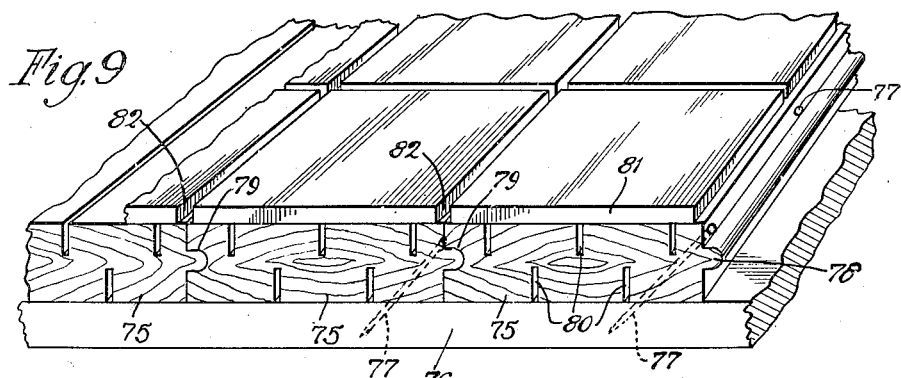
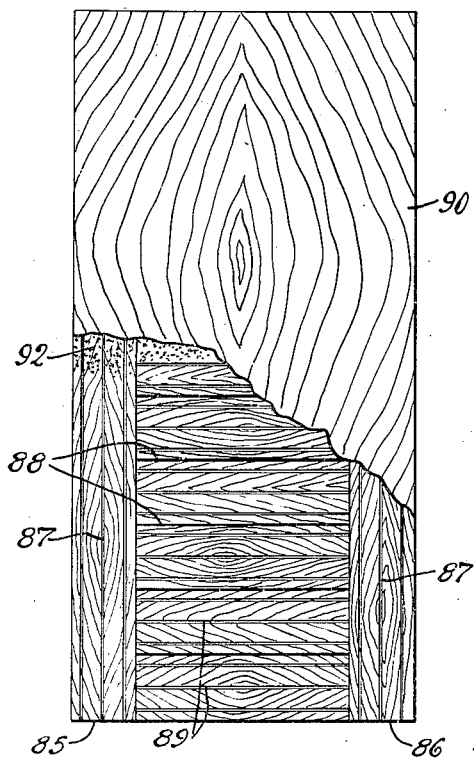
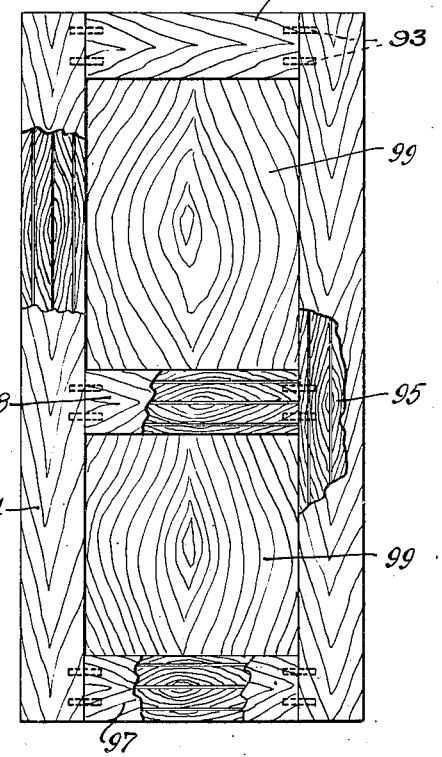
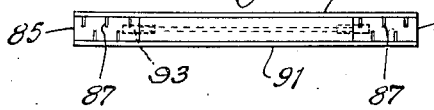
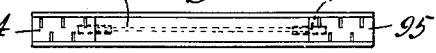
Inventor
Frederick Weyerhaeuser
by W. Bartlett Jones
Attorney Patented Aug. 1, 1944

2,354,725

UNITED STATES PATENT OFFICE 2,354,725

MANUFACTURE OF COMPOSITE LUMBER AND ARTICLE THEREFOR

Frederick Weyerhaeuser, St. Paul, Minn., assignor to Rock Island Sash and Door Works, Rock Island, Ill., a corporation of Illinois Application March 24, 1939, Serial No. 263,823

8 Claims. (Cl. 20—91)

The present invention relates to lumber and to bodies made therefrom.

Common defects of low-grade lumber are knots, irregular grain and the tendency to warp. Certain uses to which products from lumber are put require a surface appearance free from knots and other defects and an ability to retain natural shape without warping. The warping tendency varies with the grain structure, the moisture content and species.

It is common practice to cut the required clear pieces from lumber, leaving the knots and a certain amount of residual clear lumber as waste. Certain products made from wood require relatively large clear pieces which must be cut from lumber relatively free of defects, and consequently costly.

It is further common practice to salvage as much of the waste as possible in the form of small blocks, which are cut to size and glued together to form a core, to the faces of which are glued clear-faced veneers or thin layers of lumber of the species and quality required for appearance. This practice has the advantage not only of salvaging waste but of producing a core free from continuous grain stresses and, hence, from warping. This practice is limited to the quantity of material available from salvage, as the cost of cutting, assembling and gluing the small pieces generally precludes the use of material of value. This practice requires the use of a quantity of glue in the core, which is injurious to tools used if subsequent fitting of hardware or remanufacture is required.

The present invention aims to provide cores which may be made from low-grade, inexpensive wood which may have irregular grain or knots or both.

An object of the invention is to kerf or scarf lengths of lumber from both faces toward but not to or past the mid-plane of lumber, in suitably spaced and arranged parallel lines longitudinally of the grain, while providing a planar midweb of unkerfed original wood.

A further object of the invention is to face such scarfed lumber on one or both faces with a veneer or ply having the desired surface qualities, to form new lumber or new bodies.

Another object of the invention is to make doors or other articles having so scarfed cores whereby a better door may be made at less expense.

Another object is to make products which can help utilize the large supply of low grade lumber available.

Another object of the invention is to make a lighter weight door, the scarfing removing as much as 15% of the weight of the core.

Another object of the invention is to make a door or lumber which is less injurious to tools.

Another object of the invention is to make a door, lumber or article which will not warp.

Various other and ancillary objects and advantages of the invention will become apparent from the following description and explanation of the invention, as set forth in connection with the accompanying drawings, in which:

Fig. 1 represents a piece of lumber with a kerfed core and surface reinforcements, particularly illustrating a filled knot-hole in the core.

Figs. 2 to 7, inclusive, represent a piece of lumber generally similar to that in Fig. 1, showing variations in the arrangements of the kerfing cuts.

Fig. 8 represents a composite flooring board involving a wide kerfed core board carrying narrow high grade flooring strips as the surfacing bridge.

Fig. 9 represents a modification of the invention in which the bridging material is provided by squares of tile.

Fig. 10 represents a flush-type door in which an assembled solid core of stiles and rails has kerfing lines, the solid core being faced with suitable high grade veneer.

Fig. 11 is an end view of the door of Fig. 10.

Fig. 12 represents a panel type door made in a standard way from composite stiles and rails embodying kerfed cores.

Fig. 13 is an end view of the door of Fig. 12.

Figure 1:
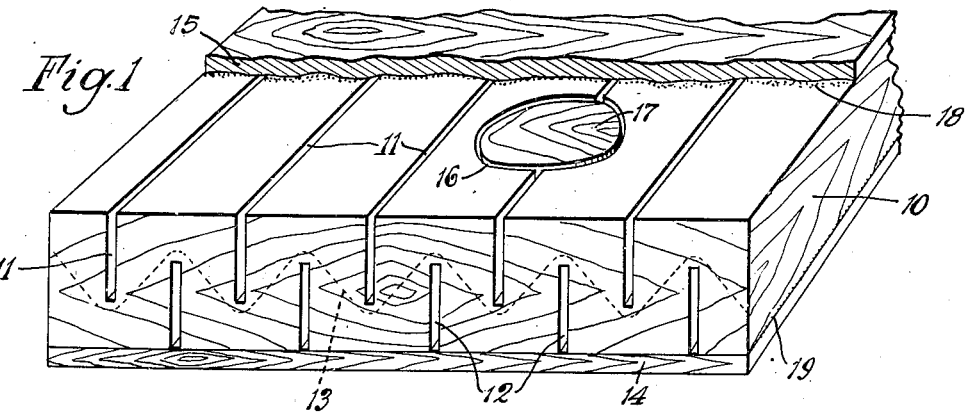

The idea is to weaken a board so that the strength lengthwise of the grain is retained, and full continuity of the cross grain (and hence some of the strength across the grain) is lost. Thus a board becomes flexible under a force which would not flex the unkerfed board. A planar midweb or a non-planar zone of wood may run through a kerfed board from edge to edge. The character of this zone is determined by the kerf lines. As the board flexes the openings of the kerfs at the board faces open or close. By bridging across these openings the flexing is practically prevented. This bridging structure operates with considerable leverage upon the wood of said zone to prevent flexing from any residual tendencies of the board to warp. Where the bridging is only on one face, the bridge must be strong in compression or tension or both across a gap, according to the direction in which the board may flex. Where it is bridged on both faces, bridges either weak or strong in tension and respectively either strong or weak in compression will lessen flexing in either direction. The bridge is in character a reinforcing member.

In the preferred forms of the invention, the bridging is supplied by veneers or plies or other rigid sheet material at both surfaces, permanently united to the scarfed faces, as in doors. Where wood is used, resawn lumber has a tendency to shrink or expand. To avoid this, plywood veneer may be used having one or more plies with grain running across one or more other plies. Where resawn lumber is used it is preferably treated to waterproof it or to render it less absorbent of moisture, whereby changes in atmospheric moisture do not lead to shrinkage or expansion or warping of the bridge. Thus where a door is faced with treated resawn lumber, there is maintained an approximate equality of tension on both sides, preventing curving or cupping of the door. The same holds true for a piece of lumber.

The invention is particularly valuable for use of low grade lumber. Where a knot-hole is present it may be ignored. Preferably it may be filled with a plug. The plug need not fit tightly, and need be only a partial closure having the same thickness as the kerfed board itself. Thus the plug provides backing for the bridging layer. The plug is preferably cemented to the bridging layer along with the kerfed surface of the core, so that the plug will not rattle if it is loosely fitted into the knot-hole. Where twisted and irregular grain is present, the kerfs effect a break in the tension along such irregularities, and thus prevent them from pulling the core into warping.

The kerfs are preferably left open to provide air channels through which there is more readily acquired a uniformity of moisture content in the core. This uniformity is another factor lessening the tendency of moisture differentials to effect warping.

In the accompanying drawings I show various forms of synthetic lumber and bodies which may have kerfed cores. These are primarily to show variations in the cores. While some have two bridging layers, and others have one, it is to be understood that any core shown may have one or more on one or on both faces, and that the specific illustration is no limitation to the illustrated use of a particular core.

The invention may be modified greatly according to the particular use of a piece embodying it. Door stiles, for example, in standard doors, have their inner edges horizontally reinforced by dowels projecting inwardly from the door rails. Therefore, it may be desirable in a door-stile core to have one type of kerf at one edge and another type at the other edge, and a different arrangement in the middle.

In Figs. 1 to 7 arrangements useful as door stiles are disclosed. In Fig. 1, there is core 10 which is kerfed in a uniform pattern the same on both faces. These consist of one set of parallel uniformly spaced kerfs 11 from one face, to a terminal plane well past the mid-plane. A similar set 12 is found on the other side with each kerf equally spaced from the two adjacent kerfs 11. The dotted line 13 merely represents the direct line of continuity in the core, of value as a reference for comparison with other forms. Numerals 14 and 15 represent thin layers of high grade lumber for surface appearance, and for bridging and strengthening the core. Layer 15 is shown cut away to disclose how inferior lumber may be readily utilized. The hole designated 16 is such as may be an original knot-hole, or a hole formed in cutting out a knot, or enlarging a knot-hole to a standard-sized defect. In this hole is shown a plug 17 which may exactly fit the hole 16, or fit loosely therein as shown. It need not be cemented or adhesively united to the core, but it is preferably rendered immovable in the hole 16 to prevent rattling. By applying adhesive 18 and 19 at the interfaces of the layers 15 and 14 the plug 17 becomes united to the layers 15 and 14. The plug 16 preferably presents a face flush with the kerfed faces of the core, but it may be thinner than the core. The layers 14 and 15, if solid material, are preferably treated in known ways to minimize absorbing and yielding of moisture, thus rendering them less likely to warp per se. These treatments are costly, and to provide a unitary stile of high grade lumber and treat it, is far more expensive. By the present invention only the surface layers need be so treated, and the core, being rendered non-warping may take up and give off moisture freely. In fact the vents provided by the kerfs induce this action. The adhesive employed is preferably a waterproof one, as commonly used in high grade lumber assemblies.

Figure 2:
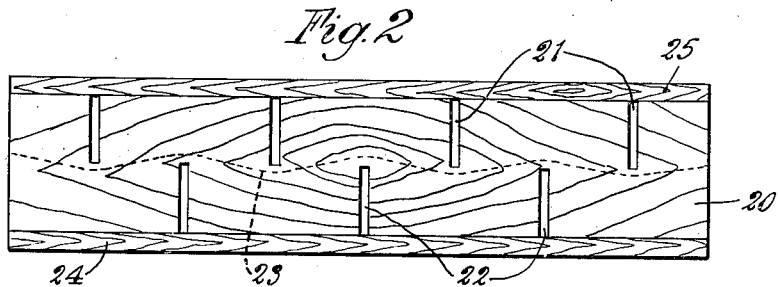

In Fig. 2 the arrangement of Fig. 1 is modified. Core 20 has kerfs 21 on one face and kerfs 22 on the other face. These sets of kerfs terminate approximately at the same intermediate plane, preferably the mid-plane. The dotted line 23 indicates the line of continuity, being only slightly wavy. Bridging layers 24 and 25 are shown as in Fig. 1.

Figure 3:
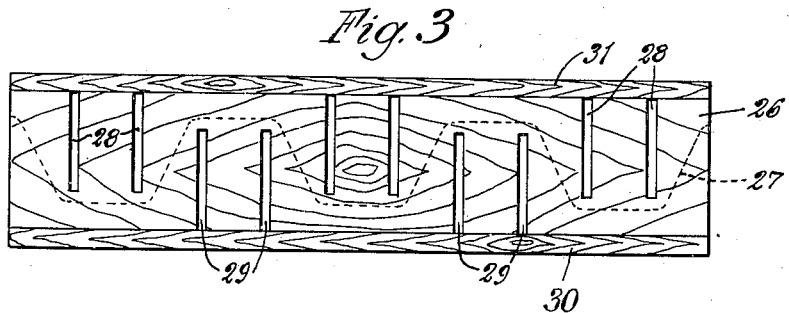

Fig. 3 is a further modification in which the arrangement brings the line of continuity alternately to each face of core 26. The continuity line is shown at 27 being formed by two adjacent kerfs 28 from the top-shown face, then two adjacent kerfs 29 from the other face, then repeating like 28 and 29. Surface layers 30 and 31 are shown.

Figure 4:
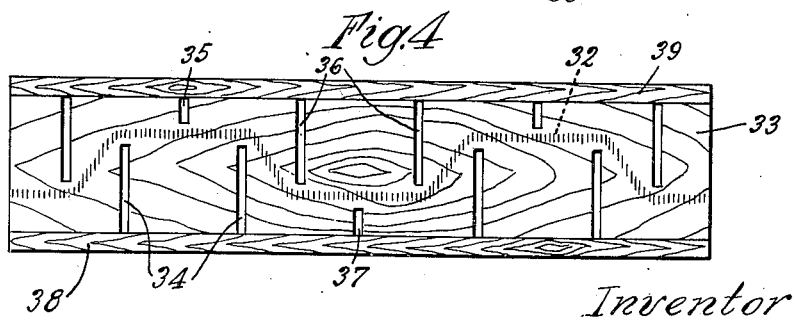

In Fig. 4, the arrangement is much like that in Fig. 3, but the continuity line 32 is removed inwardly from the surfaces of core 33. The pattern is a pair of kerfs 34 spanning but not overlapping kerf 35 from the other face, then an overlapping kerf which is one of a pair 36 which spans but does not overlap short-depth kerf 37 comparable to kerf 35 on the opposite face. Surface layers 38 and 39 are indicated.

In Fig. 5 there is a continuity planar zone 40 at the mid-plane of core 41. Two like sets of kerfs 42 and 43 extend to this zone. Surface layers 44 and 45 are shown. These with the continuity zone 40, provide three parallel strength-giving elements. In other words the core per se is reduced in warping tendencies to those of a very thin board like the zone 40, but even this tendency is minimized by the bridging effect of the surface layers.

In Fig. 6, the continuity line 47 zig-zags about the line of the mid-plane of core 48, by appropriate kerfs 49 from one face and kerfs 50 from the other. Surface layers 51 and 52 are indicated.

Fig. 7 represents the idea of combination of one or more set schemes. The core 54 has bridging surface layers 55 and 56. Each face of the core has kerfs. The set of kerfs 57 and the set 58, define straight-line ends for the dotted line of continuity 59. The remaining kerfs 60 are staggered and overlapping, giving a wavy mid-section to line 59. Thus the structure is a combination of the schemes of Fig. 5 and Fig. 1. Similarly other combinations or heterogeneous irregularity may be employed.

The invention is not limited to the forms illustrated. A flooring board may be formed wherein there is a core and one or more high grade bridging members on one surface of the core with or without a low grade cheap bridging surface on the bottom. In Fig. 8 core 65 has tongue 66 and groove 67 permitting such core to be matched in floor formation in a regular way. It has kerfs designated generally as 68. Surface flooring boards are made narrow to minimize warping, expansion and shrinkage. Kerfed boards like the cores herein described lack these bad tendencies, so that a floor base of matched cores like core 65 will not warp, or exhibit shrinkage.

It forms an excellent sub-floor board on which the usual thin narrow floor boards may be placed in advance. However, because of the improved properties of each core, a wide core board may be used and several widths of surface flooring 69 be carried thereby, united preferably by adhesive 70. These are shown with abutting edges 71. An edge 72 may project at either edge of the core, preferably at the grooved edge, leaving a complementary receiving space 73 at the other edge. A bottom bridging layer 74 is shown. The surface layers may be treated as described.

Fig. 9 represents a sheathing or a flooring board of core 75 nailed to a sub-floor or stud or joist 76 by nails 77. The core has tongue 78, groove 79, and suitable kerfs 80. One face of the core is bridged by a surfacing layer of lumber or the like 81, of width approximately the same as the core. This surface layer 81 might even be tile or adjacent blocks of earthen tile adhesively united to the core. A space 82 may thus be provided for tile cement. With this structure an ordinary carpenter may tile a wall or floor by the carpenter's installing methods.

In Figs. 8 and 9 the cores are preferably kerfed as shown (type of Fig. 5). Other forms may be used. The form shown is preferred because the core has tongue and groove. Such boards in matching are forced edgewise by strong blows into tight fitting position. The mid-web provided by the preferred form takes this force and assures that the core is not compressed relatively to the bridges, whereby the union between core and surface layer may be broken. Where tongue and groove are omitted, any form may be used. Likewise, if the tongue and groove are so constructed as to preclude the use of a disturbing force in matching, any form may be used.

The present invention provides a composite lumber or body comprising a wooden core or core assembly kerfed with multiple cuts along the grain from each face into the core. The core board is not materially weakened along its length or thickness, but only along its width. It becomes more flexible. The undesirable warping, expansion and shrinkage takes place across the grain, so the kerfs eliminate these disadvantages. The resulting weakening is compensated for by the bridging material, whether it be lumber, artificial wall board, or tile, so long as it is sufficiently rigid and stiff to prevent flexing of the core when applied to at least one face of the core to reinforce the weakened core.

The strength characteristics required, depend upon the combination of the assembly as above described, but where there is only one face bridged, the bridging material cannot unduly stretch or be compressed by pressure normally received from the core. The preferred form of core for door stiles is one so kerfed that the zone of continuity thereof is planar, as illustrated in Fig. 5. Therein the zone 40 is preferably made thin.

The form of Fig. 5 exhibits three solid spaced webs 45, 46 and 44. The middle web provides a practical amount of rigidity against unequal shrinkage of face veneers. It has an important function in making such a stile into doors, when the parts are assembled in door clamps. This assembling produces tremendous pressures from dowels entering stiles, which pressures tend to squeeze the stile edgewise. Too weak a core, as in Fig. 1, having too weak a veneer, easily wrinkles in such operations. But where the midweb 46 is present, this may be made to take up the compression and prevent wrinkling.

Where one surface only is bridged, the composite body is excellent for walls, ceilings, floors and the like where only one surface is exposed. The bridging material may be selected from a wide range of materials to give the desired exposed surface. Inexpensive or low grade materials may be used on the concealed side. But where the kerfed core is bridged on both faces, a composite lumber is provided for many uses where ordinary lumber may be used with two exposed faces. An example of such use is doors, as described below.

In Fig. 10 a flush type of door is shown having a core built of kerfed lumber, comprising stiles 85 and 86, kerfed at 87. Adjacent rails 88, also kerfed at 89 have their ends abutting the inside edges of stiles 85 and 86. This core assembly is bridged on both sides at 90 and 91 with 3-ply veneer wood having a cross-grain mid-ply using adhesive 92, preferably of a waterproof type. The door of Fig. 10 is built up as a composite body and involves a composite core. Such a door utilizes low grade cheap lumber and production is not limited by the quantity of waste salvage available. It is also to be understood that the core may be built of low-grade lumber before kerfing it, and the assembled core may be run through a machine to kerf it. The whole core may be kerfed lengthwise and crosswise to assure the lengthwise kerfing of all the lengths of lumber in the core. This may weaken the lengths longitudinally, but the veneer compensates for this. If desired the kerfs in horizontal and vertical directions in Fig. 10, accomplished after assembling unkerfed rails and stiles, need not cross, and may be limited to lengthwise kerfing of the pieces of lumber shown.

In Fig. 12 a panel type door is shown built up of composite lumber of the present invention, such as the forms shown in Figs. 1 to 7. Composite kerfed-core stiles 94 and 95 have doweled to them, composite kerfed-core top rail 96, bottom rail 97 and lock rail 98. Panels 99 complete the door. Such a door embodies lower-cost lumber, and the poorer qualities thereof are overcome by the kerfing. As a result a door is obtained which is practically as strong as a door of high grade integral lumber, and is practically free from danger of warping, or alteration. The kerfs are exposed at the door ends, and afford channels whereby all the core lumber arrives more quickly to a uniform moisture content.

It is noted that in Figs. 11, 12 and 13, dowels 93 are shown uniting the cores of rails and stiles. Especially in the door of Fig. 10, these are employed on the cores by pressing the parts together to insert the dowels, prior to applying the overall veneers 90 and 91. Thus, the midweb is the only element in the stile to resist this assembling compression.

Numerous modifications are permitted, which are not illustrated in the drawings. The drawings and description will suggest such changes to those skilled in the art, and the necessity or opportunity to use forms different from those illustrated will lead to such modifications.

For example, in Figs. 1 to 7 there are shown pieces of composite lumber in which the surface veneer is one piece at each face, and the core is one piece from edge-to-edge. In Fig. 8, there is a departure whereby there are several narrow strips over a single wider core. The joint between these strips parallels the length of the core. But in Fig. 9, there are joints in the surface material which are crosswise of the length of the core. In Fig. 10, the door shows numerous kerfed cores side-by-side under a surface ply covering a large number of cores.

It is therefore to be understood that in the broadest aspects of the invention, one or more kerfed cores, or one or more pieces of surface ply, or both, may be used together in a single piece. Thus a wide piece of lumber may be made by laying kerfed cores edgewise, to constitute a multiple or composite core, and treating the same with one or more pieces of reinforcing material in accordance with this invention.

In the accompanying claims these and numerous other modifications and embodiments not specifically illustrated or described, are contemplated as falling within the scope of the invention defined by said claims.

I claim:

1. A door comprising an assembly of wooden stiles and rails between said stiles, said rails and stiles being kerfed from each face by multiple cuts along the grain into the wood in staggered relation from face to face whereby the kerfed piece is continuous to provide a planar midweb from edge to edge and rendered after kerfing more flexible on bending lines along the grain, and a single sheet of reinforcing surfacing material on each face of said assembly, said material being secured to each kerfed face to provide a bridge across each kerf opening into the face, whereby to strengthen the elements of said assembly, said rails being doweled into the side edges of the stiles with dowels entering into the said midwebs.

2. A door comprising at least two spaced wooden stiles kerfed by multiple cuts along the grain from each face into the wood in staggered relation from face to face whereby there remains connecting wood as a planar midweb from edge to edge of the stile, and a bridging reinforcing sheet secured to each face of each kerfed stile and to each kerfed face at each side of a kerf opening into said face, said midwebs providing edgewise resistance to compression forces on the interior of the stile.

3. A composite board comprising a wooden board kerfed from both faces by multiple cuts staggered from face to face along the grain providing a connecting planar midweb of wood from edge to edge of the board, and reinforcing sheet-like surfacing material in one or more pieces on one face of said kerfed board and secured thereto on both sides of a kerf covered by said material.

4. A door comprising an assembly of wooden members providing stiles and rails, each of said members comprising a core member kerfed from each face by multiple cuts staggered from face to face along the grain into the wood whereby the kerfed piece has a planar midweb which is continuous from edge to edge, and reinforcing material on each face of each core member, said material being secured to each kerfed face to provide a bridge across each kerf opening into the face.

5. A door comprising an assembly of wooden stiles and rails between said stiles, said rails and stiles being kerfed from each face by multiple cuts along the grain into the wood whereby the kerfed piece has a planar midweb which is continuous from edge to edge, none of said kerfs being opposite each other, and all of said kerfs extending to a depth sufficient to leave a thin planar unkerfed section of the kerfed piece from edge to edge, and reinforcing surfacing material on each face of said assembly, said material being secured to each kerfed face to provide a bridge across each kerf opening into the face, whereby to strengthen the elements of said assembly.

6. A door comprising an assembly of wooden members providing stiles and rails, each of said members comprising a core member kerfed from each face by multiple cuts along the grain into the wood whereby the kerfed piece is continuous in a single plane from edge to edge, none of said kerfs being opposite each other, and all of said kerfs extending to a depth sufficient to leave a thin planar unkerfed section of the kerfed piece from edge to edge, and reinforcing material on each face of each core member, said material being secured to each kerfed face to provide a bridge across each kerf opening into the face.

7. A board-like structure comprising a wooden core board kerfed along its length from both faces inwardly by a plurality of parallel kerfs extending to a depth providing a planar midweb of the material intermediate the faces of the board from edge to edge of the board, no kerf on one side being opposite a kerf from the other side, and facing material secured to at least one of the kerfed faces, whereby the mid-web gives crosswise strength to the structure, and whereby the offset kerfs and the facing cooperate in imparting resistance to flexure.

8. A door comprising a single piece of composite lumber, the latter consisting of a woden core and a reinforcing sheet secured to each face of the core, the core consisting of an assembly of pieces of wood with the grain of each piece running in one of two right-angular directions, there being at least two pieces providing parallel stiles at opposite edges of the door with the grain of the stile members parallel to the length, and of rail members extending between said stiles with ends abutting the inside edges of the stiles with grain running lengthwise of the rails, each core-forming stile and rail being kerfed by multiple cuts along the grain from each face into the wood in staggered relation from face to face, whereby there remains in each a planar midweb from edge to edge, the reinforcing sheets being secured to the core at each side of each kerf as a bridging reinforcement, the said midwebs providing for compressional resistance at the junction of rails and stiles on the interior of both.

FREDERICK WEYERHAEUSER.